July 18, 1950 A. G. NASH 2,516,068
ROTATING CAMERA MOUNT
Original Filed April 22, 1943 4 Sheets-Sheet 1

INVENTOR
Alfred G. Nash
BY
Blair, Curtis & Hayward
ATTORNEYS

July 18, 1950            A. G. NASH            2,516,068

ROTATING CAMERA MOUNT

Original Filed April 22, 1943            4 Sheets-Sheet 2

INVENTOR
Alfred G. Nash
BY
Blair, Curtis & Hayward
ATTORNEYS

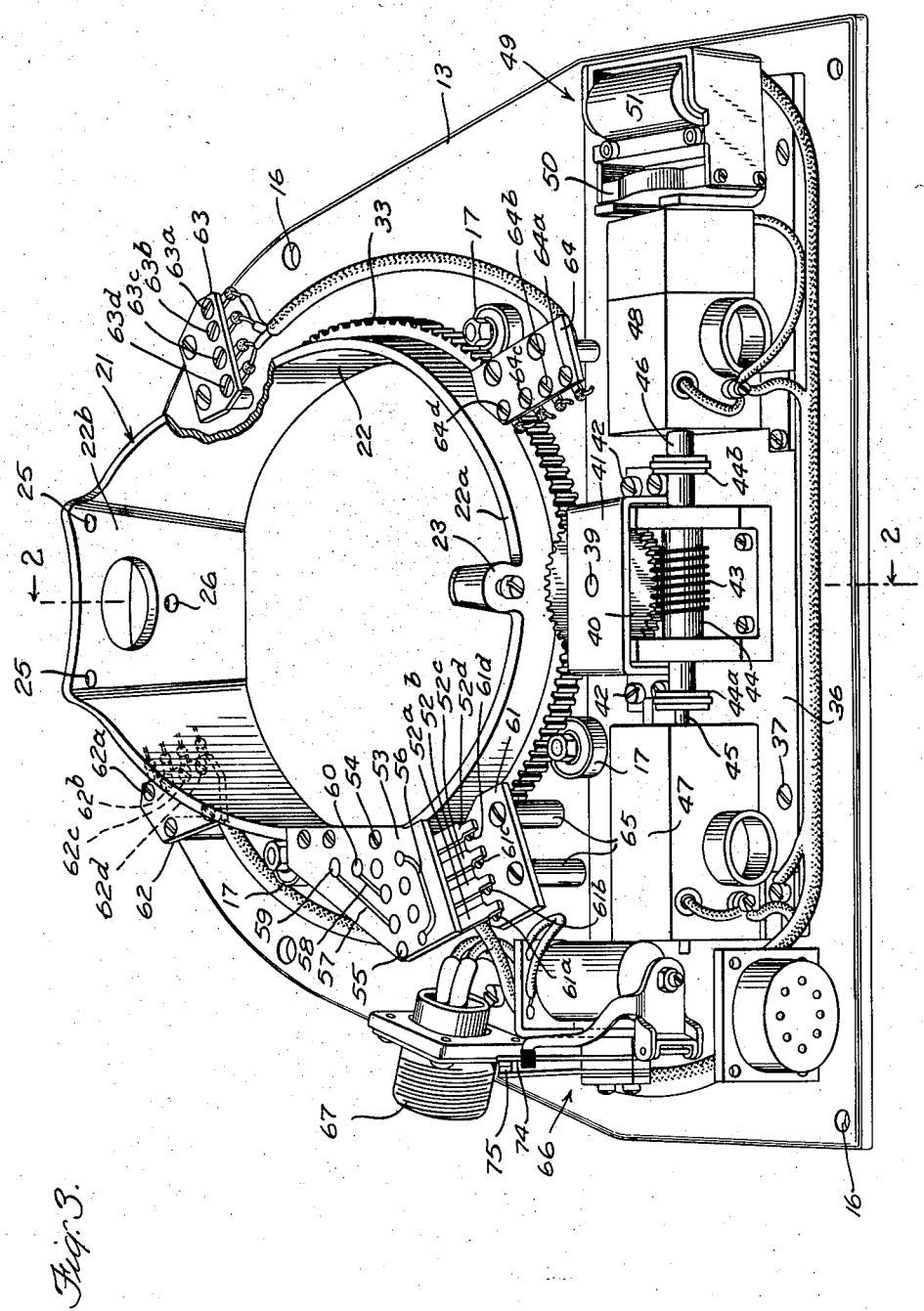

July 18, 1950 A. G. NASH 2,516,068
ROTATING CAMERA MOUNT
Original Filed April 22, 1943 4 Sheets-Sheet 4
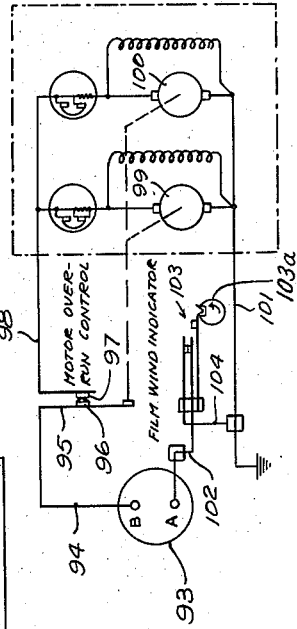
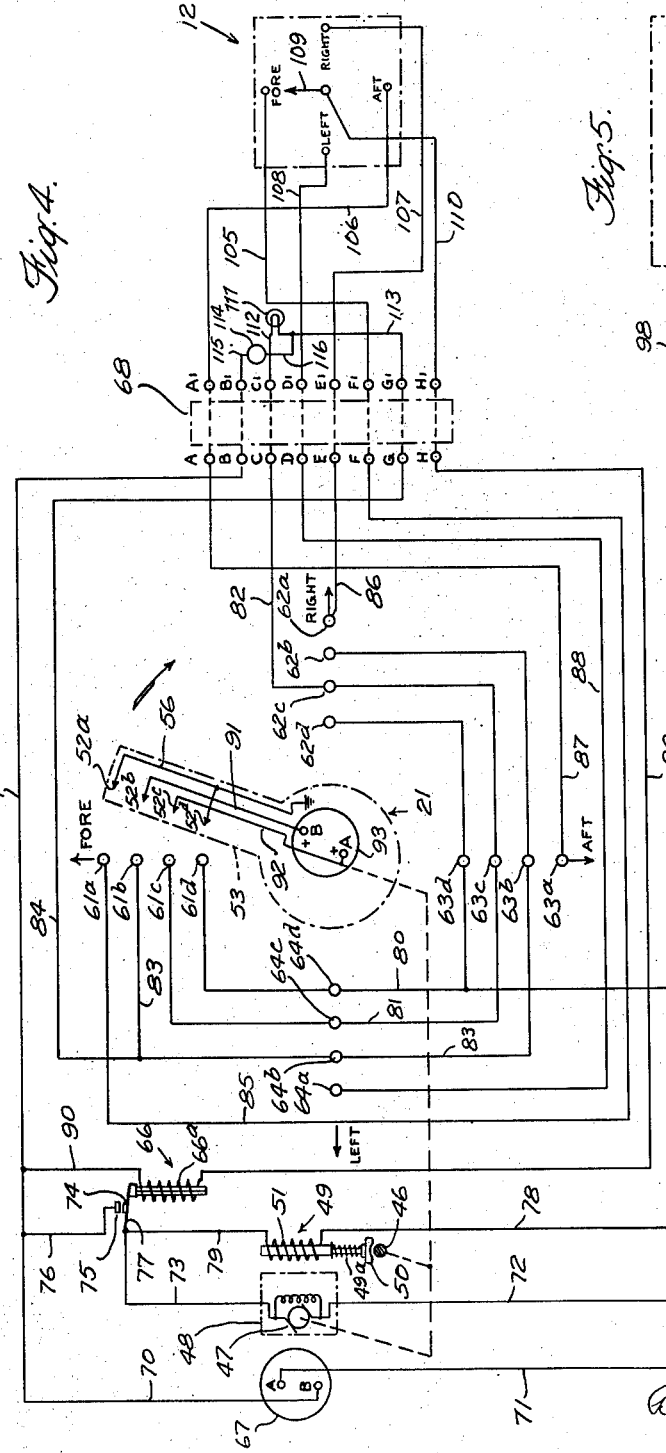
INVENTOR
Alfred G. Nash
BY
Blair, Curtis + Hayward
ATTORNEYS Patented July 18, 1950

2,516,068

UNITED STATES PATENT OFFICE 2,516,068

ROTATING CAMERA MOUNT

Alfred G. Nash, Richmond Hill, N. Y., assignor to Fairchild Camera and Instrument Corporation, Jamaica, N. Y., a corporation of Delaware Original application April 22, 1943, Serial No. 484,088. Divided and this application October 4, 1946, Serial No. 701,190

5 Claims. (Cl. 248—183)

1

This invention relates in general to photographic apparatus, and more particularly to a mount adapted to be attached to an airplane for rotatably supporting an aerial camera. This application is a division of my co-pending application, Serial #484,088, filed April 22, 1943, which issued on February 11, 1947, as United States Letters Patent 2,415,563.

It is often desirable in military reconnaissance work, as well as in other types of aerial mapping, to photograph terrain or specific subjects while the airplane is traveling at a relatively high speed and at a relatively low altitude, illustratively 250 miles per hour at 300 feet above the terrain or object being photographed. Under such conditions, particularly in military reconnaissance, it is desirable to employ small high speed aircraft capable of evasive action of which heavy bombers or large observation planes are incapable.

Aerial photography, under such conditions accordingly necessitates equipment different from that customarily used, particularly in the instance of the shutter which must be of an extremely high speed design, and the camera should be so mounted on the airplane that its optical axis can be displaced as desired so that the pilot of the airplane can operate the camera from a position remote from its mounting. Of course a mount capable of attaining these ends must be of simple and rugged construction so as to make certain reliable operation under extremely adverse conditions, in order to assure successful completion of the particular mission.

It is accordingly among the objects of this invention to provide a mount for rotatably supporting and controlling an aerial camera which can attain the above ends, in addition to many others, in a thoroughly practical and efficient manner. Other objects will be in part apparent and in part pointed out hereinafter.

The invention accordingly consists in the features of construction, combinations of elements, and arrangements of parts as will be exemplified in the structure to be hereinafter described, and the scope of the application of which will be indicated in the following claims.

In the drawing, wherein I have shown one form of my invention:

Figure 3 is an enlarged perspective view of the camera mount, the cover being removed and portions broken away to show more clearly various structural features of the mount;

Figure 4 is a wiring diagram for the camera mount; and,

Figure 5 is a wiring diagram of the camera itself.

Similar reference characters refer to similar parts throughout the various views of the drawing.

Figure 1:
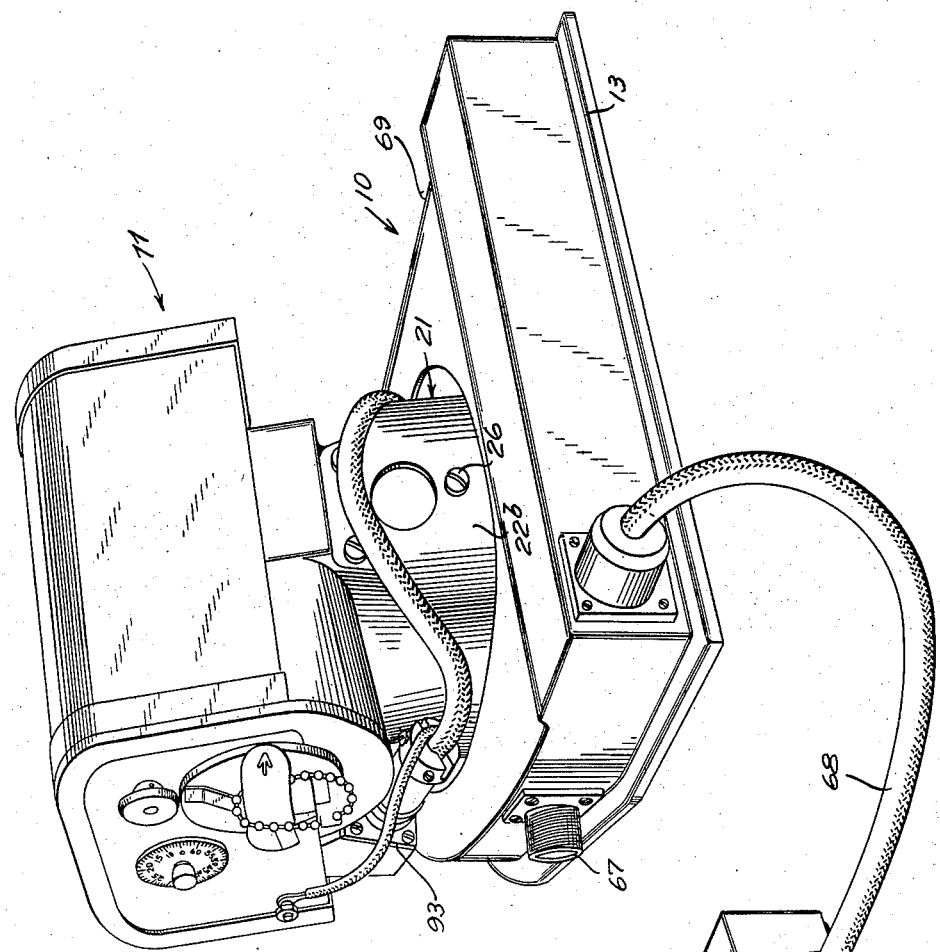
Figure 1 is a perspective view of my mount with the camera supported therein, this view also showing the remote control panel by which the camera is positioned.
Figure 1A:
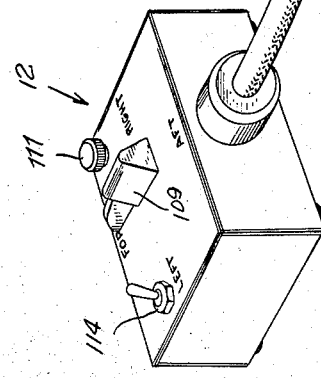
Figure 1A is a diagrammatic view of the camera mount and control panel installed in an airplane.
Figure 1A:
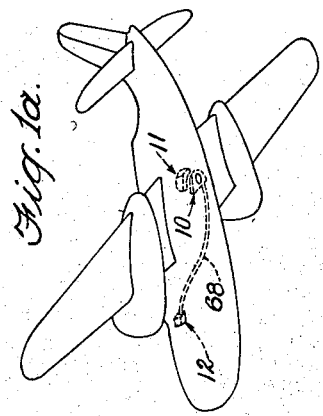

Referring first to Figure 1, the camera mount is generally indicated at 10 and has mounted therein a camera generally indicated at 11, which may be of any suitable type, but preferably has a shutter capable of high speed operation. The camera mount 10 is preferably so arranged that camera 11 is held in a position approximately 18° off its vertical axis, so that the field of view intercepted by a prism or mirror attachment on the end of the camera cone (described hereinbelow) extends from the horizon downwardly about 36° (see Figure 2). As will be described, camera 11 can be rotated in a horizontal plane through a complete circle and can be stopped and operated at any one of a plurality of settings. This operation can be effected by manipulation of a control panel or box generally indicated at 12 (Figure 1) located at a remote position from the mount as, for example, in the cockpit of the airplane convenient to the pilot so that the pilot can take oblique pictures fore, aft or to either side of his line of flight. Furthermore, the operator can change the camera from one setting to another with sufficient rapidity to photograph the same object from the rear that was taken in front, while traveling at a substantial speed at a relatively low altitude.

Figure 2:
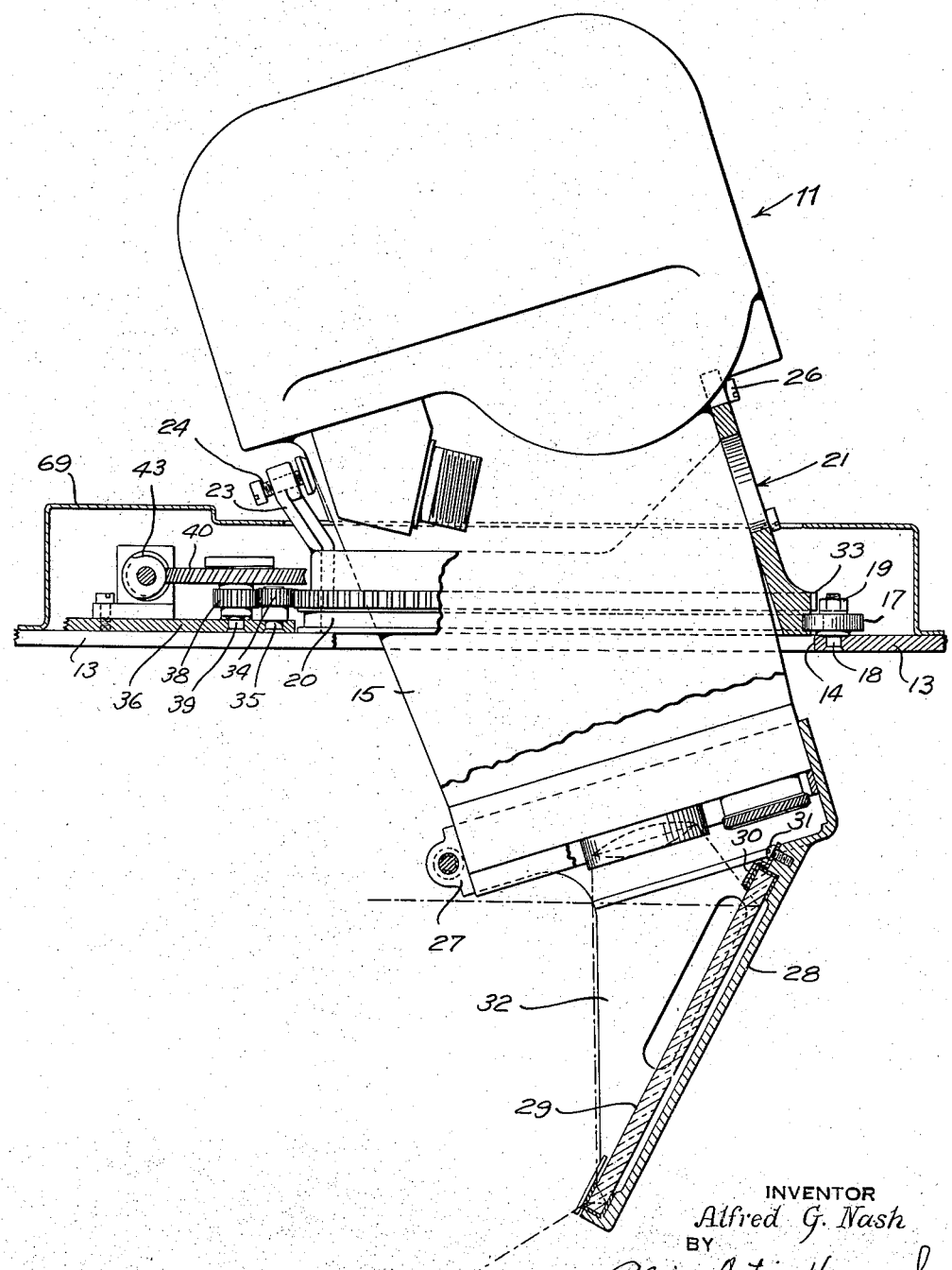
Figure 2 is a side elevation with certain portions broken away and other portions shown in section, showing the mount with the camera supported therein.

Mount 10 includes a base 13 which supports the various operating mechanisms and, as is shown in Figure 2, is provided with an enlarged opening 14 through which the cone 15 of camera 11 extends when the camera is secured to the mount. Base 13 is provided with a suitable number of holes 16 (Figure 3) provided to receive bolts (not shown) or other devices for securing the camera mount to the airplane (not shown).

At regularly spaced points about opening 14 in base 13 (Figure 2) I provide supporting rollers, such as roller 17, rotatably mounted, preferably by an anti-friction bearing, on a stud 18 which extends upwardly through base 13 and through the roller. The roller is held on the stud and the stud is held in the base by a nut 19 threaded on the upper end of the stud. There are preferably four of these rollers 17 provided, three of which may be seen in Figure 3. These rollers 17 are so dimensioned as to extend inwardly of the edge of opening 14 (Figure 2) and into a channel 20 formed in the bottom of a camera retaining ring generally indicated at 21 (see also Figures 1 and 3). Ring 21 is formed to clear the camera through its center in such a manner that the camera cone 15 is directed downwardly through opening 14 in base 13 so that the optical axis of the camera is inclined from the vertical, preferably by an amount on the order of 18°. To this end, ring 21 includes a circular wall 22 having a relatively low portion 22a and a higher portion 22b. Wall portion 22a has integrally formed therewith an upstanding inclined bracket 23 (Figure 2) through which is threaded a padded clamping screw 24 which serves as a steady rest for the camera at a position diagrammatically opposite portion 22b of ring wall 22. This portion 22b of the ring wall is preferably flat, as shown in Figure 3, and has formed therein a number of holes 25 to receive screws 26 (Figure 2) adapted to be threadably received in the upper portion of camera cone 15, thus to secure camera 11 in proper position within ring 21. It may now be seen that camera supporting ring 21 supports camera 11 in the desired position and is rotatably supported on base 13 of the mount by rollers 17 to enable rotation of the camera about the axis of the ring.

To the lower portion of camera cone 15 (Figure 2) is attached a suitable bracket or clamp 27 from which extends an angled support 28 in which a mirror 29, for example, may be detachably held, as by a clamp 30 fastened to support 28 by a screw 31. Support 28 is preferably held rigid in its angular position by a pair of oppositely disposed side walls, such as side wall 32, extending downwardly from the side of clamp 27 to the edge of support 28. Support 28, and accordingly the plane of mirror 29, is preferably disposed at such an angle that the field of view intercepted by the mirror extends from the horizon downwardly by an amount on the order of 36°, thus enabling the pilot to take pictures oblique from the position of the camera in the airplane.

As shown in Figure 3, supporting ring 21 has integrally formed therewith an annular boss in which are cut gear teeth 33. These teeth 33 (as shown in Figure 2) thus comprise an annular gear disposed immediately above groove 20, and accordingly are in a position to mesh with an idler pinion 34 rotatably mounted preferably by an anti-friction bearing (not shown) on a stud shaft 35 extending upwardly through and suitably secured in a plate or platform 36. Plate 36 is detachably secured to base 13 (Figure 3) as by screws 37, so that the plate, together with the various devices secured thereto, may be installed on or detached from the mount base as a unit. Pinion 34 (Figure 2) meshes with a spur gear 38 rotatably mounted on a stud shaft 39, also secured to and extending upwardly from plate 36. This stud shaft also rotatably supports a gear 40 which is attached in any suitable manner to spur gear 38 so that both gears rotate together. The upper end of shaft 39 (Figure 3) is supported in the top of a U-shaped bracket 41, the feet of which are secured to plate 36 as by screws 42, the bracket thus surrounding gears 40 and 38 and providing ample support for shaft 39.

Large gear 40 (Figure 3) meshes with a worm gear 43 fastened to or formed on a shaft 44, the opposite ends of which are attached as by suitable flexible couplings 44a and 44b, respectively, to the armature shafts 45 and 46 of a pair of motors 47 and 48. Thus, it will appear that these motors are connected in tandem and together drive the train of gears comprising worm 43, gears 40 and 38 (Figure 2) idler 34 and ring gear 33, thus to rotate ring 21 and accordingly camera 11. It should also be noted that this train of gears constitutes a substantial reduction so as to permit the use of small high speed motors 47 and 48. Of course, if desired, a single motor only may be used.

It will now appear that when motors 47 and 48 are energized they together drive shaft 44, and accordingly ring 21 through the reduction gear train described, so as to rotate the camera about the axis of ring 21 into any of several positions as desired, all as will be described in greater detail. Also, as will be described, it is desirable that the pilot be able to position the camera at any one of several predetermined stations; to preclude the camera coasting beyond the selected station, I preferably provide a magnetic brake generally indicated at 49 in Figure 3. This brake may be of any suitable type, and accordingly may comprise a braking unit 50 adapted to clamp the armature shaft 46 of motor 48 when solenoid 51 of the brake is deenergized, thus precluding both of motors 47 and 48, and accordingly the camera, from coasting.

Still referring to Figure 3, I have provided a set of illustratively four contacting strips, 52a, 52b, 52c, and 52d attached to an insulating block 53 which is fastened to retaining ring 21 as by screws 54. These strips are fastened to block 53 as by rivets 55 so that the outer strips may be connected by a conductor 56. The rivets which secure the two inner strips to block 53 are electrically connected as by conductors 57 and 58 to metallic contacts 59 and 60, respectively, which contacts are in turn electrically connected to the control circuit of the camera, as will appear from the following description of the wiring diagrams shown in Figures 4 and 5.

Illustratively, four contact plates, 61, 62, 63, and 64 are disposed in quadrature about camera retaining ring 21. These plates are formed of suitable insulating material, and each is secured, as for example plate 61, to a pair of posts 65 extending upwardly from and in turn secured to base 13 of the camera mount. Each of these plates carries the same number of contacting buttons as the contacting strips 52. Thus, plate 61 is provided with buttons 61a, 61b, 61c, and 61d, plate 62 with buttons 62a, 62b, 62c, and 62d, plate 63 with buttons 63a, 63b, 63c, and 63d, and plate 64 with buttons 64a, 64b, 64c, and 64d. Thus, there are on each of these contact plates a set of buttons positioned to engage the contacting strips attached to plate 53 when ring 21 is rotated through the several stations. As will be described hereinafter, the rotation of ring 21 is automatically controlled so that when one of the contact plates 61—64 is selected, the ring automatically stops so as to position the contacting strips 52a—52d in engagement with the contact buttons on the selected plate, as for example plate 61 in Figure 3. At the time contact is made between the strips and buttons, ring 21 not only immediately stops rotation by reason of the action of magnetic brake 49, but also a circuit is completed to the circuit in camera 11 (Figure 1) which automatically effects operation thereof.

With reference to Figure 3, a normally closed relay, generally indicated at 66, is secured to mount base 13, and it is this relay which controls the operation of motors 47 and 48 when the control panel 12 (Figure 1) is adjusted. Current is supplied to the mount circuit from the aircraft supply at a socket 67, while control panel 12 is connected to the mount circuit by a cable 68. As shown in Figure 1, the operating mechanism for the mount is preferably housed within a detachable cover 69, which is readily removable for access to the mechanism.

The operation and control of my above-described mount can best be understood by reference to the wiring diagrams shown in Figures 4 and 5. As noted above, current is supplied to the mount from the aircraft supply by socket 67. To the terminals of this socket are connected main leads 70 and 71 across which motors 47 and 48 are connected by way of leads 72 and 73. Lead 73 is connected to a movable contact 74 which coacts with a stationary contact 75 connected by a lead 76 to lead 70. Thus, when contacts 74 and 75 are in engagement, motors 47 and 48 operate. Contact 74 is mounted on the armature 77 of relay 66, and as this relay is normally closed, contacts 74 and 75 are normally out of engagement. Coil 51 of magnetic brake 49 is connected across leads 71 and 73 by leads 78 and 79 so that when the circuit of motors 47 and 48 is closed to energize the motors, brake coil 51 is energized to retract brake element 50 from the armature shaft 46 of motor 48. When, however, the motor circuit is broken by reason of the separation of contacts 74 and 75, coil 51 of the magnetic brake is deenergized permitting brake spring 49a to force brake 50 against shaft 46, thus preventing the motors and accordingly the camera mounting ring 51 (Figure 3) from coasting.

Referring back to Figure 3, the inside contact buttons 61d—64d are connected in series by a wire 80 which in turn is connected to lead 71 from the current supply. The next to the inside contact buttons 61c—64c are connected together by a wire 81 which is in turn connected by a lead 82 to a terminal C. The next to the outside set of contact buttons 61b—64b are connected together by a wire 83 which is in turn connected by a lead 84 to a terminal G. Outside button 61a is connected by a wire 85 to a terminal F; outside button 62a is connected by a wire 86 to a terminal E; outside button 63a is connected by a wire 87 to a terminal A, and outside button 64a is connected by a wire 88 to a terminal D. This set of terminals also includes terminals B and H connected respectively to main lead 70 and a lead 89, the other end of lead 89 being connected to the coil 66a of relay 66. The other end of this coil is connected by a lead 90 to main lead 70, and hence to one side of socket 67.

Insulating block 53 is indicated diagrammatically in Figure 4, and the contact arms carried thereby are indicated by the arrows 52a—52d.

It may be seen that the inner and outer contact strips 52a are connected by wire 56 and thence to ground; the next to the outer strip 52b is connected by a lead 91 to a post B; the next to the inside strip 52c is connected by a lead 92 to a post A. Posts A and B correspond to posts A and B shown in socket 93 in Figure 5 and lead to various elements of the camera circuit, as will be described.

Thus post B of the camera circuit is connected by a lead 94 to a movable arm 95 carrying a contact 96 which is normally in engagement with a stationary contact 97 connected to a lead 98. Contacts 96 and 97 constitute an overrun control for the camera motors, and are automatically separated when the supply of film in the camera magazine has been exhausted. Inasmuch as the specific details of the camera circuit and its operation comprise no part of the present invention, it will suffice to point out that lead 98 is connected to one side of camera motors 99 and 100, the other sides of the motors being connected by a lead 101 to ground. Post A of socket 93 is connected by a lead 102 to one side of a film wind indicator, generally indicated at 103, the other side of the indicator being connected by a lead 104 to ground. This indicator is preferably driven directly by the film and is so constituted as to flash once for each cyclic operation of the camera, the indicator preferably being located in control box 12 where it is readily visible to the operator of the camera or the pilot of the airplane, as the case may be, so as to indicate to him the proper operation of the camera.

Terminals A—H (Figure 4) are connectable with a complementary set of terminals A1—H1 by cable 68. Terminals F1, A1, E1, and D1 are connected respectively by leads 105, 106, 107, and 108 to the several control positions of control panel 12 herein illustratively designated as fore, aft, right, and left, respectively.

Control panel 12 includes a selector switch 109 (see also Figure 1) which is movable to any of the stations indicated, and this switch is connected by a lead 110 to terminal H1. A camera signal light 111 is connected across terminals C1 and G1 by leads 112 and 113, respectively, while an "on-off" switch 114 is connected to terminal B1 by a lead 115, the other side of the switch being connected by a lead 116 to lead 113. Preferably, camera signal light 111 and "on-off" switch 114 are located on control panel 12, as shown in Figure 1, so as to be readily visible and available to the pilot, or to whomever is operating the camera.

Thus, assuming that "on-off" switch 114 is turned to its "on" position, the operation of the control is as follows: When the selector switch or switch arm 109 (Figure 4) in the control panel 12 is manually rotated to a desired position such as, for example, the "fore" position, a circuit is closed to energize the driving motors 47 and 48, causing the mount ring 21 and accordingly insulating block 53 to rotate clockwise. This circuit is constituted as follows: socket 67, leads 71, 72, motors 47, 48, lead 73, contacts 74 and 55, and leads 76 and 70 back to the other side of socket 67. It should be noted, however, that this circuit is energized only when contacts 74 and 75 are closed, and these contacts are closed only when relay 66 is deenergized. This relay is energized only when selector switch 109 is in one of the control panel positions indicated and when contact strips 52a—52d are in engagement with one of the sets of contact buttons, for example, set 61a—61d. Thus, for example, when the contact strips are in engagement with that set of buttons, and selector switch 109 is at the "fore" position, the following circuit is completed: switch arm 109, lead 110, terminals H1 and H, lead 89, relay 66, lead 90 and lead 70 to one side of socket 67; the other side of socket 76, lead 71, wire 80, contact button 61d, contact strip 52d, conductor 56, contact strip 52a, contact button 61a, lead 85, terminals F and F1, lead 105 to the "fore" station, and thus back to selector arm 109. This circuit, however, is broken when switch arm 109 is moved from the "fore" station and accordingly relay coil 66a is deenergized, permitting contacts 74 and 75 to close, thus to energize the motor circuit. The motors then operate to rotate mount ring 21 and accordingly contact strips 52a—52d to the position selected, and when the strips engage the contact buttons at the selected station, the circuit to relay coil 66a is reconstituted and motor control contacts 74 and 75 are separated, thus breaking the circuit to the operating motors 47 and 48. When these contacts separate, the circuit to magnetic brake 49 is also broken, permitting brake spring 49a to press brake shoe 50 against the armature shaft 46 thus immediately stopping motors 47 and 48 and accordingly preventing mount ring 21 from coasting beyond the desired position.

When contacts strips 52a—52d engage with a set of contact buttons, for example buttons 61a—61d, the camera circuit shown in Figure 5 is connected to the current supply. This circuit is constituted as follows: socket 67, lead 70, terminals B, B1, lead 115, "on-off" switch 114, lead 116, lead 113, camera signal light 111, lead 112, terminals C1 and C, lead 82, contact button 62c, wire 81, button 61c, contact strip 52c, lead 92, post A, film wind indicator 103 and lead 104 to ground, lead 56 (Figure 4) contact button 61d, wire 80 and lead 71 to the other side of socket 67, thus energizing the film wind indicator circuit. The energizing circuit for camera motors 99 and 100 is constituted as follows: socket 67, lead 70, terminals B and B1, lead 115, "on-off" switch 114, lead 116, lead 113, terminals G1 and G, lead 84, wire 83, contact button 61b, contact strip 52b, lead 91, post B, lead 94 (Figure 5), lead 95, contacts 96 and 97, lead 98, motors 99 and 100, lead 101 to ground, wire 56, contact strip 52d, contact button 61d, wire 80 and lead 71 to the other side of supply socket 67.

Thus engagement between contact strips 52a—52d with buttons 61a—61d energizes the camera circuits which control the camera motors and the film wind indicator. In this connection, it should be noted that film wind indicator 103 includes a cam 103a adapted to be rotated by the film in the camera magazine. Thus when the unexposed film is exhausted, the circuit through the film wind indicator is automatically broken and as the camera signal light 111 (Figure 4) is in this circuit, it cannot light, thus indicating to the operator or pilot either that the film is exhausted or is otherwise unavailable for exposure.

Furthermore, the outside contact buttons 61a—64a and the inside buttons 61d—64d in conjunction respectively with contact strips 52a and 52d control the position of the camera.

It will thus be seen that the camera can be operated at will whenever the mount is stationed at one of the four positions, but that it will not operate, even when switch 114 (Figure 4) is on, while the mount is rotating (except when it passes over a set of contact buttons on its way around to the selected set). If desired, a solenoid operated counter or the like (not shown) may be substituted for magazine signal light 111 in order to provide the operator with an actual record of the number of exposures taken or remaining in the camera.

Thus I have provided a camera mount which attains the several objects hereinabove set forth in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. Photographic apparatus comprising, in combination, a mount, a tubular camera support, means rotatably securing said support on said mount, a camera attached to and extending through said support, means for rotating said support and said camera relative to said mount, and remote control means for stopping rotation of said support at a predetermined position.

2. Photographic apparatus comprising, in combination, a mount having a circular opening extending therethrough, a camera support rotatably secured on said mount and having a circular opening extending therethrough with a tubular extension coextensive with said opening and extending therefrom, a camera secured to said tubular extension and extending through said opening, an electric motor secured to said mount for rotating said support, stopping means for deenergizing said motor, means spaced peripherally around said mount for actuating said stopping means, and means responsive to actuation of said stopping means for applying braking force to said support.

3. In photographic apparatus, the combination of, a rotatable support having a longitudinal opening therethrough, a camera mounted on and within said opening of said support with the optical axis thereof extending through said opening, a motor for rotating said support, control means remotely located in respect to said camera and supports, means forming an operative connection between said control means and said motor, said control means being operable to effect energization of said motor to cause rotation of said support, and means associated with said connection means and said support for automatically stopping rotation of said support at any one of a plurality of predetermined positions in accordance with a selected adjustment of said control means.

4. In photographic apparatus, the combination of, a base having a hole formed therein, a ring member rotatably mounted on said base above said hole, said ring member having peripheral gear teeth thereon and adapted to support a camera so that the camera extends through said ring and through said hole in the base, a motor secured to said base, and reduction gearing connecting said motor and said ring whereby operation of said motor rotates said ring and accordingly said camera.

5. Photographic apparatus comprising, in combination, a mount adapted to be installed in a fixed position and having a circular opening formed therein, a camera support adapted to be rotatably carried by said mount and including a tubular section the axis of which is inclined with respect to the axis of rotation of said mount, a plurality of antifriction members on said mount rotatably carrying said support, a camera extending through and secured to said tubular section whereby the camera's optical axis is inclined with respect to the axis of rotation of said support, means including an electric motor carried by said mount for rotating said support and accordingly said camera through 360°, and stopping means for deenergizing said motor at predetermined angularly spaced stations throughout the path of rotation of said support.

ALFRED G. NASH.

REFERENCES CITED

The following references are of record in the file of this patent:

UNITED STATES PATENTS

| Number | Name | Date |
|---|---|---|
| 1,463,446 | Snowden | July 31, 1923 |
| 1,735,109 | Eliel | Nov. 12, 1929 |
| 1,898,185 | Howell | Feb. 21, 1933 |
| 1,955,770 | Richards | Apr. 24, 1934 |
| 2,393,851 | Wills et al. | Jan. 29, 1946 |
| 2,415,563 | Nash | Feb. 11, 1947 |

FOREIGN PATENTS

| Number | Country | Date |
|---|---|---|
| 564,796 | France | Oct. 30, 1923 |
| 715,342 | France | Sept. 28, 1931 |
| 516,185 | Great Britain | Dec. 27, 1939 |